April 10, 1951  C. SCHEMBRA  2,548,560
SCREENED VEHICLE WINDOW OPENING
Filed Aug. 29, 1947  4 Sheets-Sheet 1

Inventor
Christopher Schembra

By Clarence A. O'Brien
and Harvey B. Jacobson
Attorneys

April 10, 1951  C. SCHEMBRA  2,548,560
SCREENED VEHICLE WINDOW OPENING
Filed Aug. 29, 1947  4 Sheets-Sheet 2

Christopher Schembra
By Clarence A. O'Brien
and Harvey B. Jacobson
Attorneys

April 10, 1951  C. SCHEMBRA  2,548,560
SCREENED VEHICLE WINDOW OPENING
Filed Aug. 29, 1947  4 Sheets-Sheet 3

Inventor
Christopher Schembra

By *Clarence A. O'Brien and Harvey B. Jacobson*
Attorneys

April 10, 1951  C. SCHEMBRA  2,548,560
SCREENED VEHICLE WINDOW OPENING
Filed Aug. 29, 1947  4 Sheets-Sheet 4

Inventor
Christopher Schembra

By Clarence A. O'Brien
and Harvey B. Jacobson
Attorneys

Patented Apr. 10, 1951

2,548,560

UNITED STATES PATENT OFFICE 2,548,560

SCREENED VEHICLE WINDOW OPENING

Christopher Schembra, Glen Ridge, N. J.

Application August 29, 1947, Serial No. 771,354

2 Claims. (Cl. 160—89)

This invention relates to a screened vehicle window opening and has for its primary object to exclude insects and the like from a vehicle when the windows thereof are moved to open position.

Another object is to facilitate the ventilation of motor vehicles and the like and to avoid injury to children or other occupants of the vehicle by confining the arms and other members of the occupants to the interior of the vehicle.

The above and other objects may be attained by employing this invention which embodies among its features mounting the sash of the rear window of a motor vehicle in such a manner that it may be moved to clear the window opening, mounting a roll screen across the lower end of the window opening in such a position that the screen may be moved across the window opening, yielding means for retracting the window sash into closed position, yielding means for retracting the roll screen into window opening position, and manually controlled means selectively to move the window sash against its retracting means to clear the window opening, and manually controlled means for moving the roll screen against its retracting means to cause it to extend across the window opening.

Other features include roll screens mounted in the sides of the vehicle to close the window openings in the sides thereof, and manually actuated means to project or retract the roll screen into window opening closing position at the desire of the user.

Still other features include guide channels on opposite sides of the window opening, spring ribbons movable in the guide channels, a screen fabric secured to the ribbons and movable therewith and a roller at the base of the window opening upon which the ribbons and screen fabric is adapted to be rolled when the screen is in open position.

Figure 1:
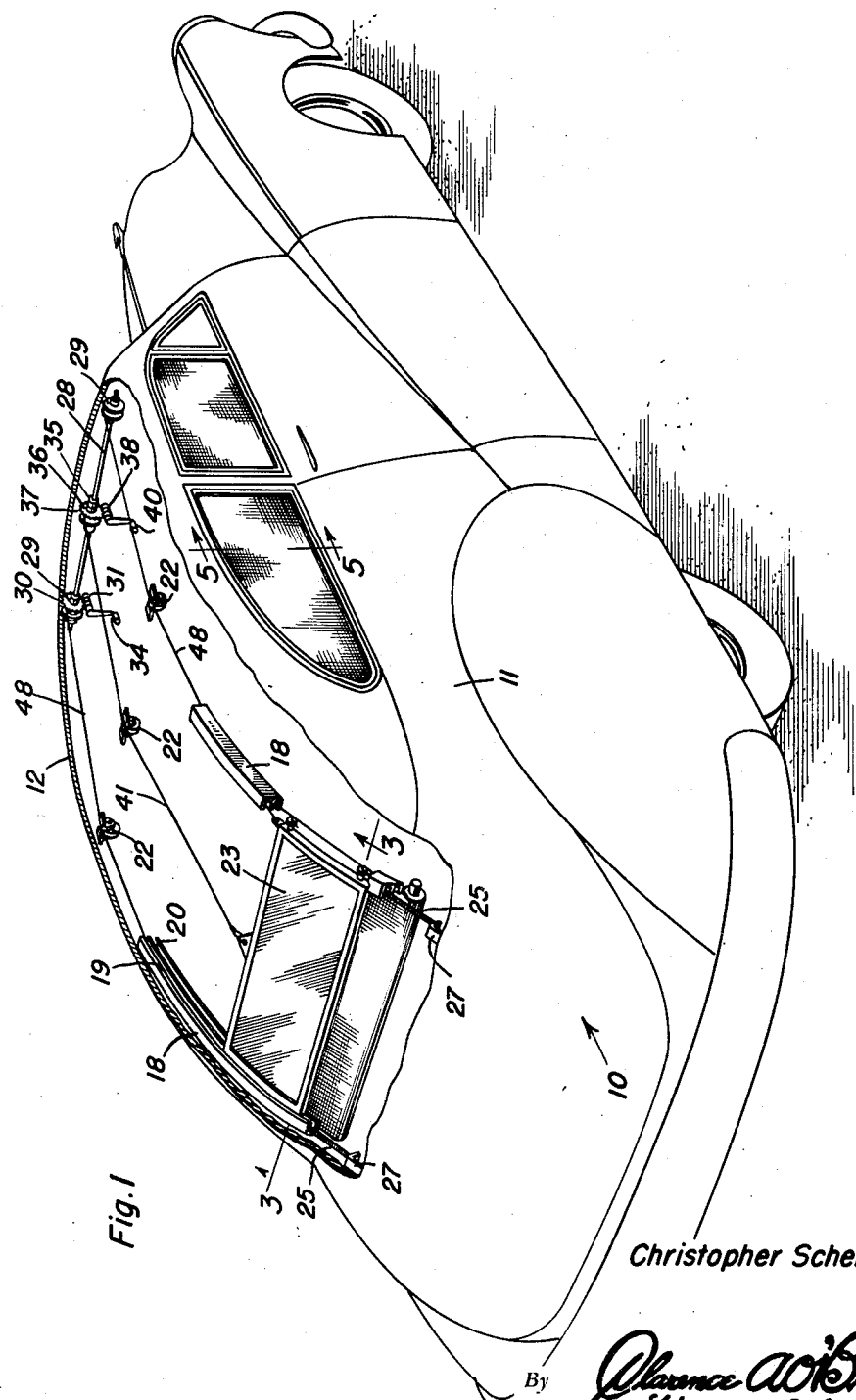
Figure 1 is a perspective view partially broken away of a vehicle equipped with screens embodying the features of this invention.

Referring to the drawings in detail a conventional motor vehicle designated generally 10 is equipped with a conventional body 11 and top 12 which is provided at its rear end with a window opening 13. The forward end of the top 12 at its junction with the wind shield 14 which is of conventional form, curves downwardly as at 15 to form a compartment 16 which extends transversely of the vehicle and is provided at opposite ends with openings 17 arranged in axial alignment for a purpose to be more fully hereinafter explained.

Fixed to the interior of the top 12 and extending along opposite sides of the window opening 13 are spaced parallel curved channel members 18 which curve concentrically about a common horizontal axis, and are provided with spaced longitudinally extending channels 19 and 20. The channels 19 and 20 are disposed toward those of the opposite channel member 18 to form guides the purpose of which will be more fully hereinafter explained. These channel members are of a length of substantially twice the height of the window opening 13 with one end of each channel being located near the lower end of the window opening while the opposite end of each channel extends well beyond the upper end of the window opening 13 and along the underside of the top 12 as will be readily understood upon reference to Figures 1 and 2. Fixed to the underside of the top 12 between the upper ends of the channel members 18 are brackets 21 carrying grooved guide rollers 22 the purpose of which will be more fully hereinafter explained. Mounted for sliding movement in the channels 19 of the channel members 18 is a window sash 23, and coupled to the lower rear corner of the sash 23 as at 24 is one end of a retractile coil spring 25, the opposite end of which is anchored as at 26 to a bracket 27 fixed to the inner face of the body 11 adjacent its junction with the top 12. These springs 25 are tensioned so as to urge the window sash 23 into closing position with relation to the window opening 13. It will thus be seen that the sash will yieldingly be held in closed position with relation to the window opening.

Mounted for rotation in the aligned openings 17 in the chamber 16 is a shaft 28 adjacent opposite ends of which are fixed winding drums 29, one of which is provided with an annular row of peripheral teeth 30 for meshing engagement with a worm 31 carried by a crank shaft 32 which is mounted in suitable bearings 33 carried by opposite side walls of the chamber or compartment 16. One end of the crank shaft projects through the inner side wall of the compartment and is provided with a hand crank 34 by means of which rotation may be imparted to the shaft 32 to cause the shaft 28 to be rotated when the hand crank is turned. Mounted for rotation on the shaft 28 intermediate its ends, and between spaced collars 35 which are fixed to the shaft 28 is a winding drum 36 which is provided along one flange with an annular row of peripheral teeth 37 for engagement with a worm 38 which is mounted on a shaft 39, which like the shaft 32 is journaled to rotate transversely of the longitudinal axis of the chamber 16 and is equipped with a hand crank 40 so that upon rotation of the hand crank, the drum 36 will be driven.

Coupled to the winding drum 36 is one end of a flexible cable 41, the opposite end of which is passed over a guide roller 22 and connected as at 42 to the edge of the sash 23. It will thus be seen that when the hand crank 40 is rotated the cable 41 will be wound upon its winding drum 21 to move the sash 23 against the effort of the springs 25 into open position with relation to the window opening 13. Obviously by reason of the worm coupling between the hand crank 40 and the drum 36 the sash will remain in adjusted position until the hand crank is turned in a direction to cause the window to move against or under the influence of the tension of the springs 25.

Figure 2:
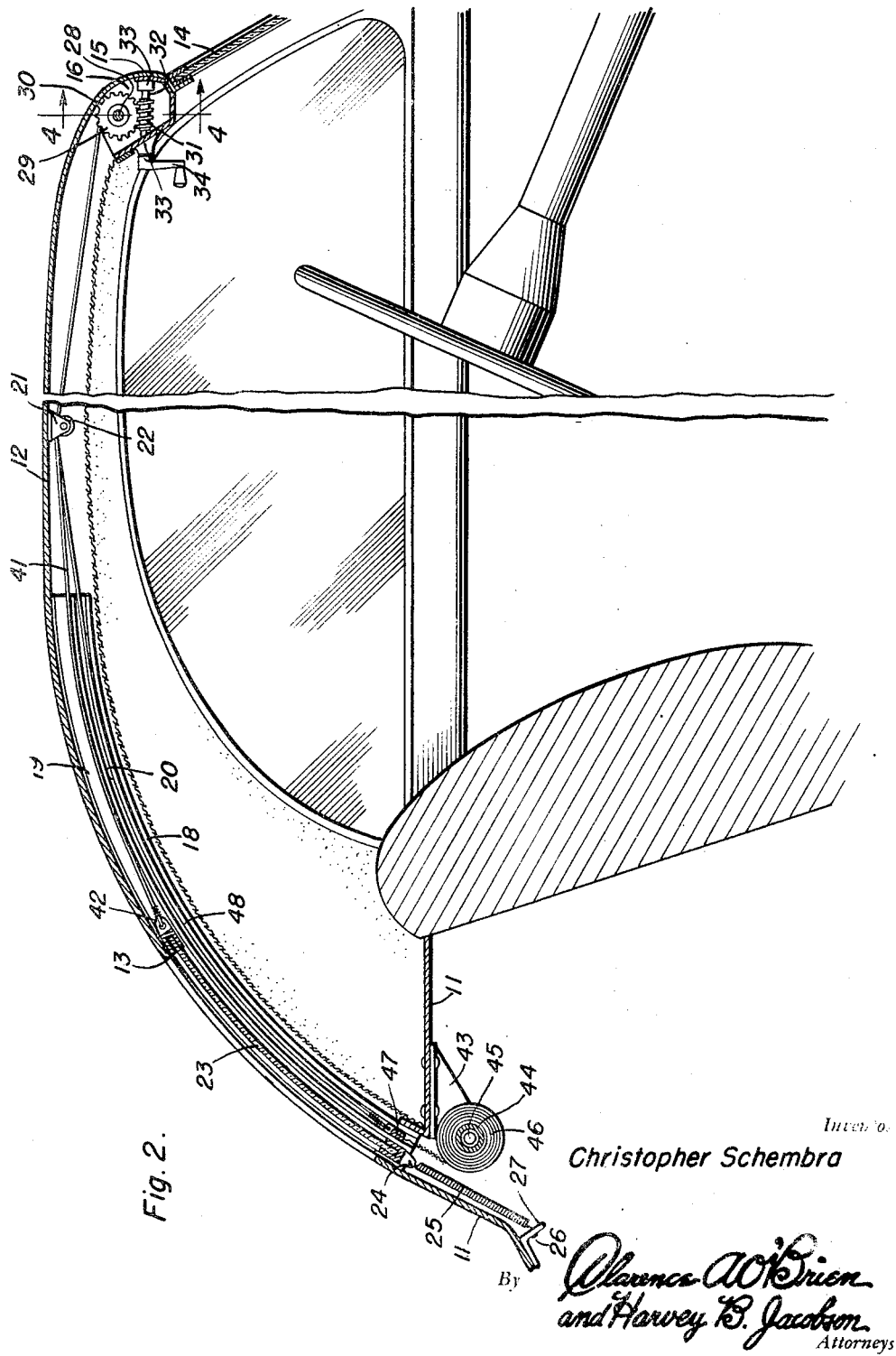
Figure 2 is a fragmentary longitudinal sectional view through the top of the vehicle illustrated in Figure 1 on a somewhat enlarged scale.
Figure 3:
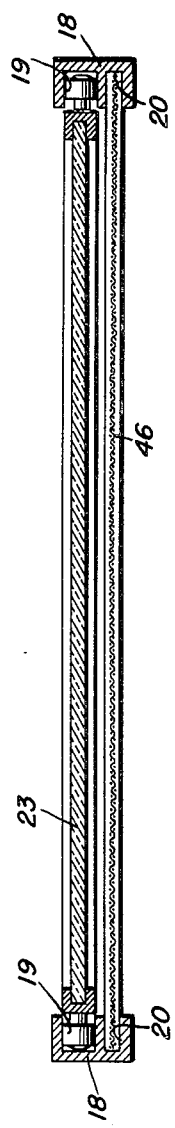
Figure 3 is a transverse sectional view taken substantially along the line 3—3 of Figure 1.
Figure 4:
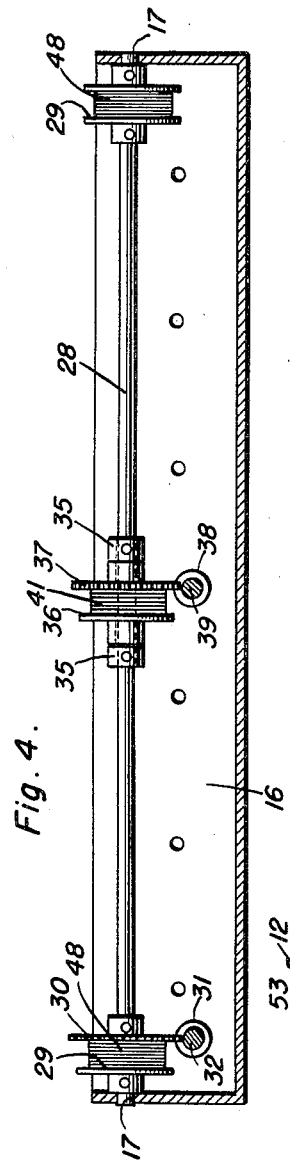
Figure 4 is a transverse sectional view taken substantially along the line 4—4 of Figure 2.
Figure 6:
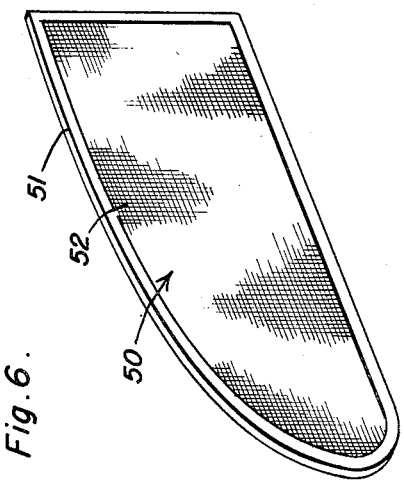
Figure 6 is a perspective view of a screen for the rear window of the vehicle.
Figure 5:
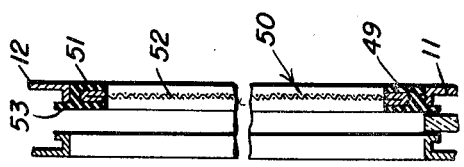
Figure 5 is a fragmentary enlarged sectional view taken substantially along the line 5—5 of Figure 1.
Figure 7:
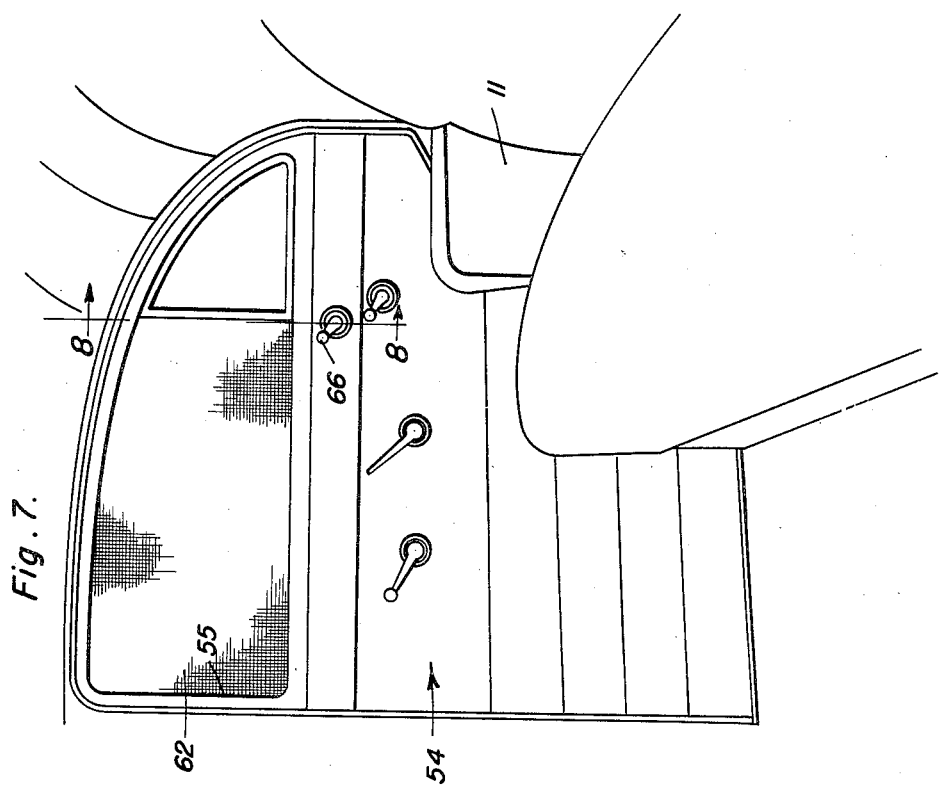
Figure 7 is a fragmentary interior view of the vehicle illustrating it equipped with a roll screen.
Figure 8:
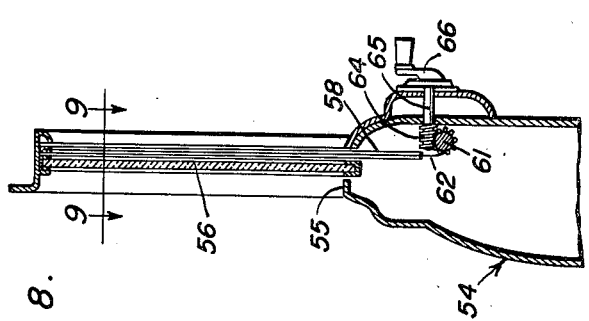
Figure 8 is an enlarged fragmentary sectional view taken substantially along the line 8—8 of Figure 7.
Figure 9:
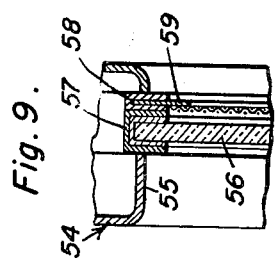
Figure 9 is a fragmentary enlarged sectional view taken substantially along the line 9—9 of Figure 8.
Figure 10:
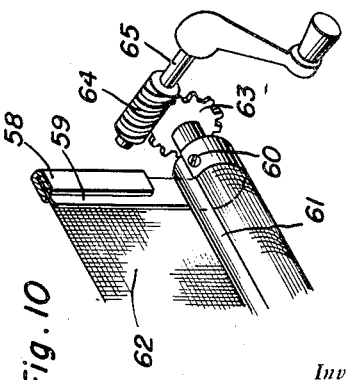
Figure 10 is an enlarged fragmentary perspective view illustrating the roll screen controlling mechanism.

In order to exclude insects and foreign matter from the interior of the vehicle when the sash 23 is open, I mount on suitable brackets 43 which are riveted or otherwise carried by the body 11 a tubular shaft 44 containing a coiled spring 45, one end of which is fixed against rotation, while the opposite end is anchored to the shaft 44. Wound about the shaft 44 is a roll of screen fabric 46 one end of which enters the channels 20 of the channel members 18 and is provided with a binding strip 47, to opposite ends of which are coupled flexible cables 48 which as illustrated in Figure 1 are carried forwardly over guide rollers 22 adjacent opposite sides of the top 12 and are connected to the winding drums 29 so that when the shaft 28 is rotated, the screen fabric 46 will be moved against the effort of the spring 45 through the channels 20 of the channel members 18 into such a position as to extend across the window opening 13. It will thus be seen that the window opening may be screened when the sash is moved to open position to exclude insects and foreign matter from the interior of the vehicle.

In certain portions of the vehicle, particularly in the side walls thereof are formed window openings 49 which may be closed by screens 50 each of which comprises a frame 51 of a shape conforming to that of the window opening 49 in which is supported in any conventional manner a panel 52 of screen fabric of conventional form. The frame 51 is preferably provided along one side with an outstanding flange 53 for engagement with a wall of the window opening, in order to form a tight junction therewith and also to serve as a retaining member by which the screen may be held in place. It will be understood of course that in its preferred form the frame 51 is formed of a yielding substance and is slightly oversized so that when it is pressed into the window opening 49 it will be held by friction against accidental movement.

Another form of the invention is illustrated in Figures 7 through 10 inclusive and is particularly designed for use in screening the window openings of the doors of motor vehicles. In this form of the invention a vehicle door designated generally 54 is equipped with a conventional window opening 55 in which a sash 56 is mounted to slide in a channel 57 in a conventional manner. Welded or otherwise attached to the channel 57 in which the sash is slidably mounted is a relatively narrow channel 58. It will be understood that the channels 57 and 58 are arranged on opposite sides of the window opening 55 with open sides disposed towards one another, and slidably mounted in the channels of the channel members 58 are ribbons 59 preferably formed of spring steel or the like. The ends of the ribbons opposite those which are retained within the channels of the channel members 58 are fixed as at 60 adjacent opposite ends of a roller 61 which is mounted to rotate about a horizontal axis within the door 54. The longitudinal axes of the channel members 58 are preferably arranged in a plane which lies tangent to the periphery of the roller 61, and fixed to the ribbons 59 and extending between the channel members 58 is a strip of screen fabric 62 which when the ribbons 59 are projected extends across the window opening 55 to serve as a protection for the occupants of the vehicle and exclude insects and the like from the interior thereof. Carried at one end of the roller 61 is a worm wheel 63 which has meshing engagement with a worm 64 mounted on a shaft 65 which extends transversely through the inner panel of the door 54 and is equipped with a hand crank 66 by means of which the shaft 65 may be rotated to cause the roller 61 to revolve and advance or retract the ribbons 59 with relation to their guide channel members 58, thus to move the screen fabric 62 into open or closed position with relation to the window opening 55. It will thus be seen that the screens may be retracted from window closing position, or may be projected into window closing position at the desire of the user simply by turning the hand crank 66.

In use when it is desired to thoroughly ventilate a vehicle equipped with this improved screening system it will be understood that by turning the hand crank 40, the sash 23 may be moved to open position and by turning the hand crank 34 the screen fabric 46 may be moved into screening position with relation to the opening 13. Likewise upon turning the conventional window controlling mechanism found in a conventional motor vehicle the side windows 56 may be lowered into open position, and upon turning the hand crank 66, the ribbons 59 will be moved upwardly through their guide channel members 58, thus causing the screen fabric 62 to be moved into screening position with relation to the window openings 55. In this way the vehicle may be thoroughly ventilated and at the same time insects and foreign matter will be prevented from entering the vehicle and annoying the occupants thereof.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a vehicle body having a window opening, a guide channel on each side of the window opening, each guide channel having a pair of longitudinally extending parallel guide grooves opening toward the opposite channel, a window sash slidably mounted in the guide grooves nearest the outside of the body, a roll screen mounted adjacent one end of the window opening, opposite side edges of the screen being slidable in the guide grooves opposite those in which the window sash is mounted, springs coupled to the window sash to move it into window closing position, spring means to move the screen out of window closing position, a shaft mounted in the vehicle body remote from the window opening, a winding drum mounted at each end of the shaft to rotate therewith, a winding drum mounted intermediate the ends of the shaft to rotate thereon, a flexible cable coupling the last named drum with the window sash, flexible cables coupling the first mentioned drums with the screen and means for operating the shaft and the intermediate drum.

2. In a vehicle body having a window opening, a guide channel on each side of the window opening, each guide channel having a pair of longitudinally extending guide grooves opening toward the opposite channel, a window sash slidably mounted in the guide grooves nearest the outside of the body, a roll screen mounted adjacent one end of the window openings, opposite side edges of the screen being slidable in the guide grooves opposite these in which the window sash is mounted, springs coupled to the window sash to move it into window closing position, spring means to move the screen out of window closing position, a shaft mounted in the vehicle body remote from the window opening, a winding drum mounted at each end of the shaft to rotate therewith, a winding drum mounted intermediate the ends of the shaft to rotate thereon, a flexible cable coupling the last named drum with the window sash, flexible cables coupling the first mentioned drums with the screen and worms and worm wheels rotating the shaft and the intermediate drum.

CHRISTOPHER SCHEMBRA.

REFERENCES CITED

The following references are of record in the file of this patent:

UNITED STATES PATENTS

| Number | Name | Date |
|---|---|---|
| 839,732 | Crocker | Dec. 25, 1906 |
| 1,147,188 | Rojas | July 20, 1915 |
| 1,367,031 | Fedders | Feb. 1, 1921 |
| 1,638,610 | Baker | Aug. 9, 1927 |
| 1,878,943 | Locke | Sept. 20, 1932 |
| 1,882,982 | Schmiedeskamp | Oct. 18, 1932 |
| 1,922,545 | Locke | Aug. 15, 1933 |
| 1,924,706 | Brown, H. P. | Aug. 29, 1933 |
| 2,014,178 | Holt | Sept. 10, 1935 |
| 2,086,092 | Pilon | July 6, 1937 |
| 2,353,217 | Brown, A. B. | July 11, 1944 |